Patented Oct. 14, 1941

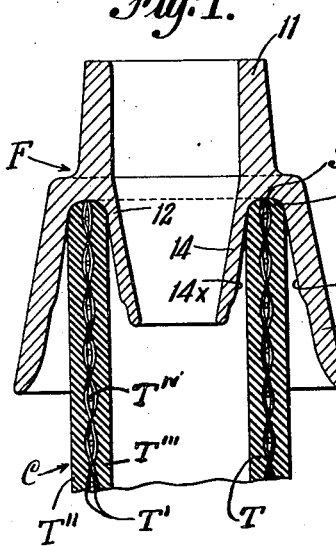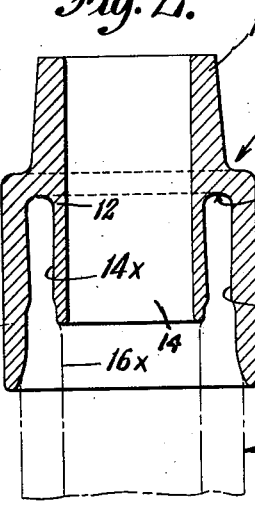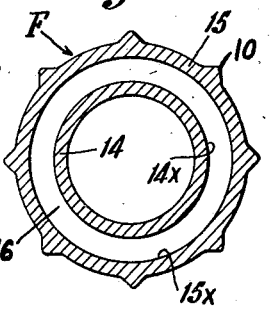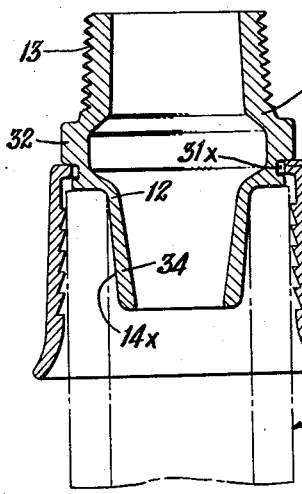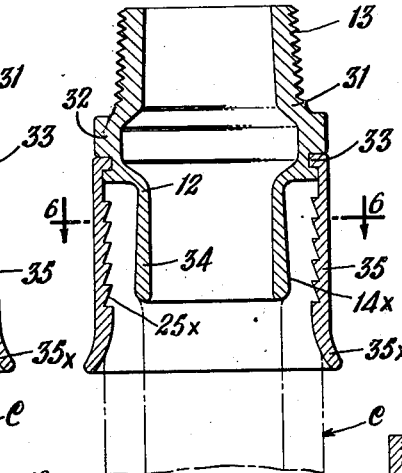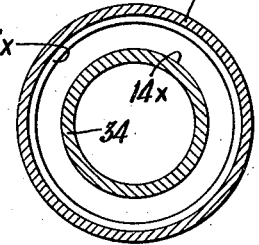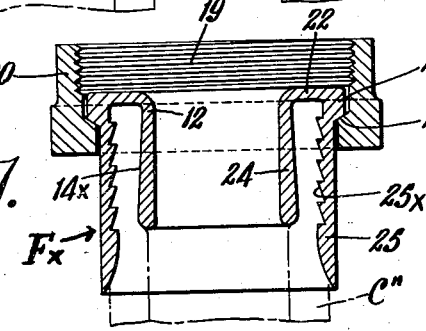

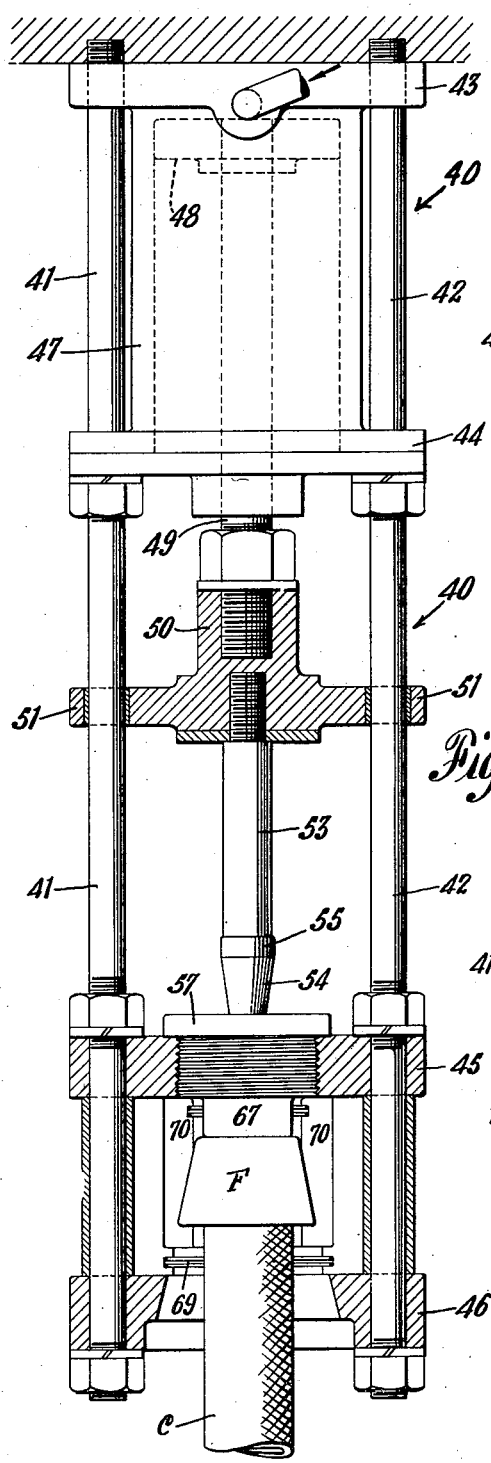
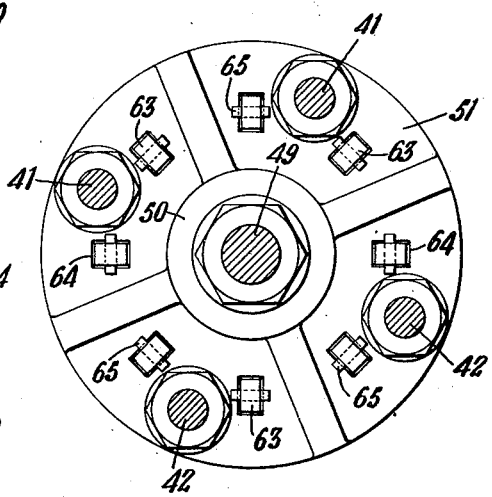
Fig. 11.
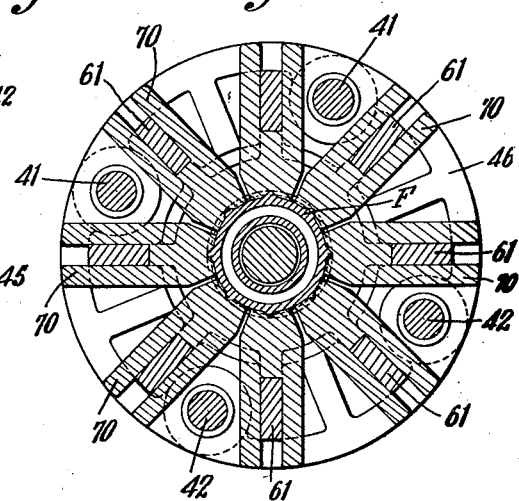
Fig. 8. Fig. 12.

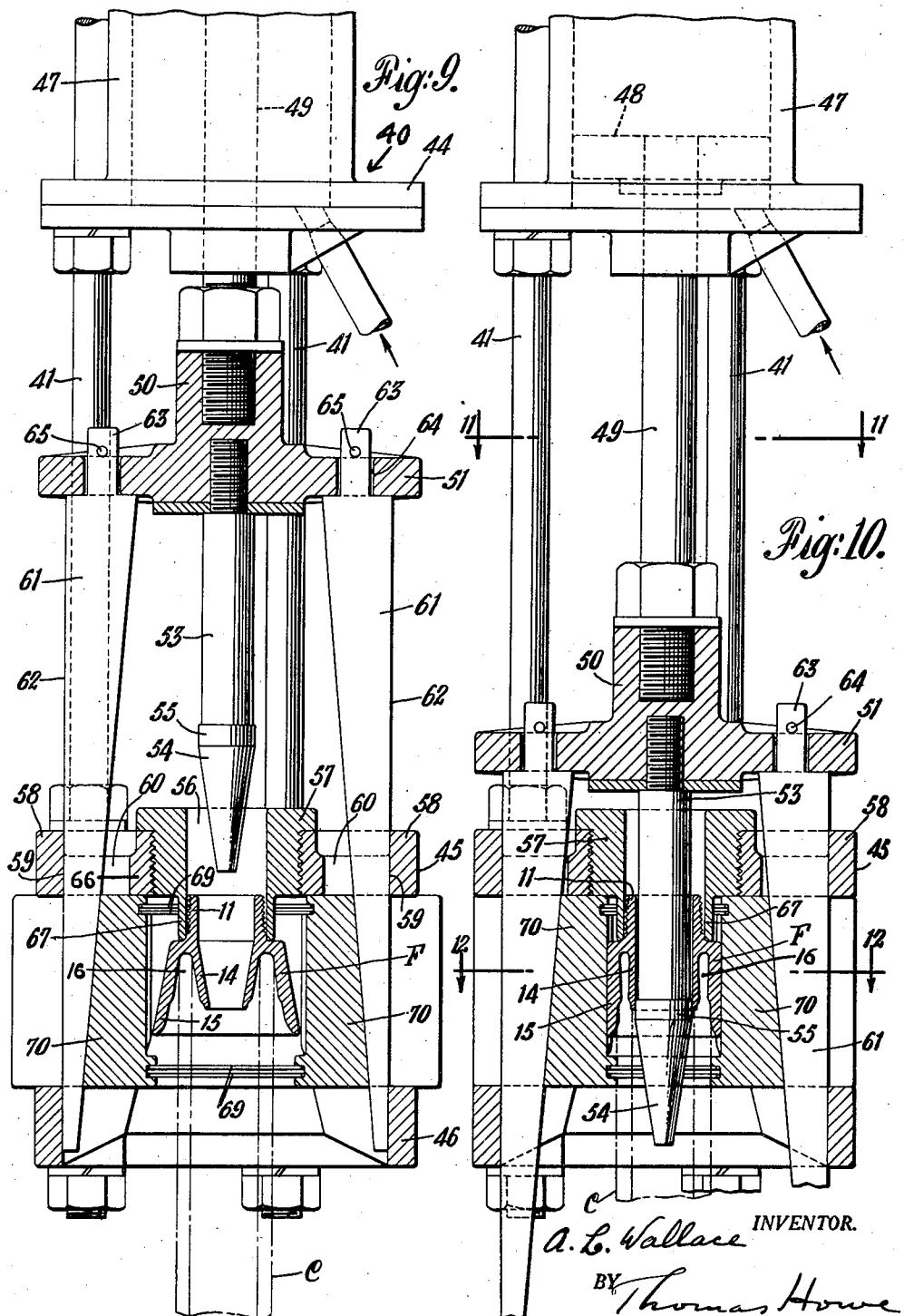

2,258,919

UNITED STATES PATENT OFFICE 2,258,919

MEANS FOR APPLYING HOSE COUPLINGS

Archibald L. Wallace, Northport, N. Y., assignor, by mesne assignments, of one-half to Archibald L. Wallace, and one-half to Cherryfield Corporation, a corporation of Delaware Original application July 2, 1937, Serial No. 151,600. Divided and this application February 26, 1938, Serial No. 192,766

4 Claims. (Cl. 29—88.2)

This invention relates to fitting members for flexible hose, especially to an end fitting of the nature of a coupling for a flexible hose having a penetrable or compressible component, as for example a garden hose of woven fabric coated with an elastic composition such as rubber, and the invention relates more particularly to such an end-fitting of the type in which a metal coupling ring is provided with parts extending inside and outside of the hose and at least one of which is bent toward the other part into clamping engagement with the end of the hose.

In order to be desirably efficient in use, an end fitting of this character should preserve the bore of the hose in a smooth condition, and substantially constant in diameter, but in this respect the conventional fittings of this type have not been altogether satisfactory for the reason that in applying the end fitting, the usage has been to apply exclusively exterior pressure to an attaching part or parts of the coupling, such as a set of peripheral fingers, or else it has been the usage to expand against the walls of the bore an enclusively inner part or parts, such as a complemental ring or a set of fingers.

The result of such compression exclusively, or expansion exclusively, has been to decrease or enlarge undesirably the diameter of the bore and in instances where the hose structure includes as an element a helically wound metal wire, this element is frequently cracked or deformed by the pressure so applied, and is no longer fluidproof. When used for conveying a gas, such as a vaporous refrigerant, the leakage is dangerous as well as wasteful and inconvenient.

Under such condition, it is an object of the present invention to provide a novel means for attaching a coupling or end-fitting of the above character in which a ring element is formed with an inner part of generally annular form; and with an outer part of generally annular form; these parts being respectively splayed divergently, so that between them is formed a channel of approximately V-shape, adapted to receive snugly the end of the hose; and whereby the fitting may be readily assembled with said hose end and secured thereon by applying simultaneously both a compressive force against the exterior element and countervailing expansive force to the interior element.

The result is that there is exerted in these opposite directions a highly effective clamping pressure, which binds the two elements convergently beyond their elastic limit respectively.

Thereby is formed an end coupling which holds the end wall of the hose under tension which may be of an order insufficient to deform a helically wound tubular component undesirably.

A further object of the invention is to provide novel mechanism certain features of which possess utility for more general use than in connection with the particular form of coupling specified, and constitute improvements over conventional mechanism for the application of other coupling structures.

Other objects and features of the invention will appear as the description of the particular physical embodiment selected to illustrate the invention progresses.

The present application is a division of my prior application Serial No. 151,600, filed July 2, 1937.

In the accompanying drawings, like characters of reference have been applied to corresponding parts throughout the several views that make up the drawings, in which:

Fig. 1 is a view in vertical sectional elevation of a hose fitting in the construction of which the present invention has been embodied, the same being shown assembled upon the end of a hose, ready for attachment thereto;

Fig. 2 is a similar view of the completed fitting, in place upon the hose;

Fig. 3 is a horizontal, sectional view on the line 3—3 of Fig. 2;

Fig. 4 is a view, similar to Fig. 1 of a modification;

Fig. 5 is a view, similar to Fig. 2, of the modification shown in Fig. 4;

Fig. 6 is a view, similar to Fig. 3 of the modification shown in Fig. 4 taken on the line 4—4 of Fig. 5;

Fig. 7 is a view, similar to Fig. 1, of another modification;

Fig. 8 is a view in vertical sectional elevation, the mechanism for applying to a hose end, the fitting illustrated in the foregoing figures taken on the line of the upright shafts;

Fig. 9 is a similar view in vertical sectional elevation, showing the interior structure of the fitting and associated parts of the mechanism taken through the line of the wedges;

Fig. 10 is a view of a similar character, illustrating the mechanism and fitting in their final positions;

Fig. 11 is a fragmentary, detail view in horizontal sectional elevation, taken on the line 11—11 of Fig. 10;

Fig. 12 is a fragmentary detail view in horizontal section taken on the line 12—12 of Fig. 10;

Fig. 13 is a view similar to Fig. 7 of a modification; and

Fig. 14 is a plan view of a split ring forming part of the Fig. 13 structure.

In a now-preferred embodiment of the invention selected for illustration and description, the part designated generally by the reference character F is an end-fitting or coupling for a conduit, and is intended primarily for use upon a flexible conduit C such as a hose, having its interior and exterior parts T''' and T'' of rubber and an intermediate coil T$^{IV}$ of metal wire with the convolutions of which are interwoven longitudinally extending cotton threads T', although use upon such a hose is merely illustrative. In the instance illustrated, an exterior flexible hose of helically wound metal strip material T' is provided, with interlocking edges T.

In pursuance of the present invention, the end fitting F is formed with a nipple part 11, the exterior of which may desirably be threaded in the manner indicated at 13 in Fig. 4, to receive a complemental coupling member of any suitable character, not shown.

In continuation of the nipple portion 11 is provided a hollow inner projection 14 and an integral outer projection 15, splayed divergently and forming an intermediate V-shaped seat or socket S adapted to receive snugly the end 16 of the conduit C.

In further pursuance of the invention, the nipple 11 and divergently splayed annular attaching parts 14 and 15 are made of a suitable metal, such as brass, somewhat resilient, but not having a very high elastic limit, and which can be deformed conveniently by a suitable tool or mechanism, designed to cause convergence of the annular parts 14 and 16 to an extent that preferably bends them somewhat closer to each other than is indicated in Fig. 2, which represents the relative position of the projection 14 and the projection 15 when they have reacted from the deforming pressure. The parts 14 and 15 in their final position are disposed substantially as indicated in Fig. 2, embracing the end wall 16 of the conduit under a certain compressive tension, the walls 14$x$ and 15$x$ being preferably slightly converging toward each other and the wall 14$x$ being disposed in substantial continuity with the inner wall 16$x$ of the conduit.

When so formed, and united to the conduit end, the latter is firmly clamped, and a strong, permanent fitting is provided, free from the disadvantages characteristic of the conventional fittings of the same general type, and to which reference has been made already.

The end 16 of the flexible conduit is held so tightly that the union is substantially as strong as the strength of the material of the flexible conduit, and in the form of Figs. 1, 2 and 3, the fitting is illustrated as a one-piece member.

It is within the purview of the invention, however, to make the divergent wall parts separately, as for example, in the form of the modification illustrated in Figs. 4, 5 and 6; and also to make the coupling proper as shown in Fig. 7 with the attaching wall parts 24 and 25 integral with a ring 22 which has a shoulder or flange 23 adapted to cooperate with a swiveling complemental flange or shoulder 21 upon a union 20 of conventional form, adapted by a thread 19, to be screwed upon a male member (not shown) in known fashion.

The annular conduit-engaging wall 14$x$ may be somewhat thicker toward its free end than nearer its root 12, as shown in all of the figures, and thus aids to grip the conduit end very firmly.

In the modification shown in Fig. 7, the wall 25$x$ of the outer boss 25 is shown as formed with rugosities 25$x$ or serrations, to supplement the frictional effect by positive means adapted to enter the penetrable component of the conduit end C'', it being understood that the wall parts 24 and 25 of this Fig. 7 structure are initially splayed divergently, as in the form shown in Fig. 1 prior to assembly.

As already indicated briefly, the outer wall part 35 in Fig. 4 is made initially in the shape of a separated bell, having a flaring lip 35$x$ and a flange 33. The part 31 in this modification has its threaded nipple 13 formed integrally with the inner boss or wall 34 and both are extended, in opposite directions, from a medial rib 32. This rib serves as an abutment for the flange 33 of the outer bell 35, and adjacent to the flange 32 is a groove 31$x$ into which the flange 33 can be pressed, as shown in Fig. 5, to complete a firm, permanent attachment, preferably of a non-rotative character.

In other respects, the method of attachment of the form shown in Figs. 4 to 6 is similar to those already described.

It is known to those skilled in the art that if a hose of the type shown in Fig. 1 be unduly distended or compressed by mechanical pressure, it becomes distorted, and the metal becomes loosened from the rubber with consequent deterioration, and the known types of couplings are likely to so injure such a conduit in the course of being applied thereto. No such disadvantage arises with the use of the novel type of fitting herein disclosed, in which the pressure is applied uniformly against the inner and outer walls of the conduit, so that there can be no undue expansion or collapsing nor other deleterious distortion, of the hose.

Any suitable means may be used to accomplish the application of the novel type of fittings above disclosed to flexible hose of any type to which the invention is applicable, but I have devised mechanism of a novel type which provides for accomplishing such application of fittings in an expeditious and permanent manner.

Referring now to Figs. 8 to 12 inclusive, a framework designated generally by the reference character 40 is provided in the instance illustrated, having pairs of upright shafts as 41 and 42, with transverse members 43, 44, 45 and 46 which serve to support the various working parts, including a hydraulic or other power cylinder 47 in which reciprocates piston 48 connected by a piston rod 49 to a vertically reciprocable crosshead 50 having its ends 51 guided by the uprights 41 and 42.

The cross-head operates a plunger 53 at the lower end of which is a mandrel 54 having a tapered leading end and a cylindrical follower portion 55. This works through an aperture 56 in a block 57 having end parts 58 (see Fig. 9) with openings 60 through which slide wedges 61 having their outer edges 62 guided by the walls 59 of the openings 60. The upper ends 63 of the wedges are fitted into openings 64 of the crosshead ends 51, and are held in place by pins 65, so that the wedges move up and down concurrently with the plunger 53.

In the block 57 is seated one of the fittings F already described, with its nipple 11 extended into a boss 67 of the block 57, and the walls 14 and 15 extend downwardly, receiving the hose end 16 in the V-shaped notch therebetween, as illustrated.

Around the circumference of the fitting are arranged in a series the die blocks 70 each of which is adapted to be moved inward radially by action of one of the wedges 61 as it descends (see Figs. 11 and 12). Expansion spring rings 69 bias the dies 70 to open position when the wedges occupy their Fig. 9 relative arrangement.

When the plunger 53 and wedges 61 have completed their downward stroke the parts all occupy the relative position shown in Fig. 10, and the walls 14 and 15 have been moved into convergent clamping engagement with the hose end 16, the attachment being better illustrated in its completed condition in Fig. 2.

Upon withdrawal of the plunger, the fitting and hose can be readily withdrawn from the press and the operation repeated.

In Figs. 13 and 14 is shown modified form of coupling adapted to facilitate ready application of standard coupling unions 20 of different sizes to a stock hose C already provided with its fitting Fx, the latter being similar to the form shown in Fig. 7, in the instance illustrated in Fig. 13.

It will be observed that with the coupling as shown for instance in Fig. 7, the union must be applied to the fitting before the latter is applied to the hose. With the structure as shown in Figs. 13 and 14, the fittings can be applied to the hose length and the thus equipped hose lengths can be carried in stock and then the hose lengths with the fittings applied can be taken from stock and the desired unions or swivels applied to suit the needs or desires of the customer. As shown, the flange 21a of the swivel or union 20 is so large that it will pass by the flange 22a of the hose fitting Fx. When the union 20 has been telescoped on the fitting Fx far enough, a spring split ring 23a can be snapped into place about the outer wall 25 of the fitting Fx. The ring then will interlock the flanges 21a and 22a together so that the parts Fx and 20 are secured together. It will now be seen that lengths of hose may be stocked with the fittings applied and when required may be taken from stock and the desired unions or swivels applied in the manner as described.

It will be noted in Figs. 3 and 12 that the fitting F therein shown is provided with peripheral ribs 10, to furnish a better grip by the hand of the operator when the hose is being coupled, and in Fig. 12 the die blocks 70 have their working ends formed of a suitable contour to clear such ribs.

In general, the dies 70 will be of a proper form to meet the exigencies of any particular forming operation.

While the invention has been illustrated in what are considered its best applications it may have other embodiments without departing from its spirit and is not, therefore, limited to the structures shown in the drawings.

What I claim is:

1. Means for applying to the end of a flexible hose a fitting comprising a metallic annular attaching member having double walls splayed divergently to provide an intermediate V-shaped channel wherein may be inserted readily an end of said hose, said means comprising an axially reciprocating plunger having a central forming means including a wedging boss of suitable diameter to enter the axial bore of said member and wedge the inner of said walls outwardly by axial movement of said plunger and a concentric forming-means adapted to pass over the exterior wall of said member, both forming means being of adequate length to engage, and to deform into retentive engagement with the hose end, said attaching walls in opposed clamping disposition and longitudinally reciprocating wedging means for radially moving said concentric means, the last mentioned wedging means and said plunger being secured together against relative movement.

2. Mechanism for applying to the end of a hose a fitting of the class described, said mechanism comprising a plunger having a central forming means including a boss of suitable diameter to enter the axial bore of said fitting and to bend said inner attachment wall outwardly into engagement with the inner walls of the hose, and a series of radially displaceable elements surrounding said outer attachment wall of the fitting to bend said outer attachment wall inwardly and a common operating means for said boss and elements.

3. Mechanism for applying fittings to hose ends, said mechanism having the features claimed in claim 2 in which a yieldingly resilient means is provided to bias said displaceable elements outwardly to clear the hose and fitting during insertion and removal, and a connecting means is provided whereby said displaceable elements are forced into closing position around said fitting when assembled with the hose.

4. Mechanism for applying to the end of a hose a fitting of the class described, said mechanism comprising a plunger having a central forming means including a boss of suitable diameter to enter the axial bore of said fitting and to bend said inner attachment wall outwardly into engagement with the inner walls of the hose, a series of radially displaceable elements surrounding said outer attachment wall of the fitting, to bend said inner attachment wall inwardly, and a series of wedges connected with said plunger and adapted to be moved by plunging action thereof into wedging engagement with said displaceable elements.

ARCHIBALD L. WALLACE.